US012561952B2

(12) United States Patent
Hirai

(10) Patent No.: US 12,561,952 B2
(45) Date of Patent: Feb. 24, 2026

(54) MEDICAL IMAGE PROCESSING SYSTEM, MEDICAL IMAGE PROCESSING METHOD, AND PROGRAM

(71) Applicant: Sony Group Corporation, Tokyo (JP)

(72) Inventor: Takayoshi Hirai, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 339 days.

(21) Appl. No.: 18/032,131

(22) PCT Filed: Oct. 8, 2021

(86) PCT No.: PCT/JP2021/037274
§ 371 (c)(1),
(2) Date: Apr. 14, 2023

(87) PCT Pub. No.: WO2022/085481
PCT Pub. Date: Apr. 28, 2022

(65) Prior Publication Data
US 2023/0386177 A1 Nov. 30, 2023

(30) Foreign Application Priority Data

Oct. 23, 2020 (JP) ................................. 2020-178138

(51) Int. Cl.
*G06V 10/764* (2022.01)
*G06T 7/00* (2017.01)
(Continued)

(52) U.S. Cl.
CPC .......... *G06V 10/764* (2022.01); *G06T 7/0012* (2013.01); *G06T 7/11* (2017.01);
(Continued)

(58) Field of Classification Search
CPC ........... G06T 11/60; G06T 2207/20081; G06T 2207/20084; G06T 2207/30096;
(Continued)

(56) References Cited

U.S. PATENT DOCUMENTS

2011/0129662 A1* 6/2011 Glaubitt .................. F24S 80/52
977/773
2015/0112182 A1* 4/2015 Sharma ................ A61B 5/0261
600/408
(Continued)

FOREIGN PATENT DOCUMENTS

JP 2019-074868 A 5/2019
JP 2020-038600 A 3/2020
(Continued)

OTHER PUBLICATIONS

International Search Report and English translation thereof mailed Jan. 11, 2022 in connection with International Application No. PCT/JP2021/037274.

*Primary Examiner* — Manuchehr Rahmjoo
(74) *Attorney, Agent, or Firm* — XSENSUS LLP

(57) ABSTRACT

The present disclosure relates to a medical image processing system, a medical image processing method, and a program that facilitate understanding of the criterion or the reason of a determination made by a machine learning model.
An estimation unit estimates classification of a medical image with use of a machine learning model. A first calculation unit calculates first ground information indicative of estimation ground of the classification by a first explanation technique, and a second calculation unit estimates second ground information indicative of estimation ground of the classification by a second explanation technique different from the first explanation technique. An output controlling unit controls output of a first explanation image based on the first ground information and a second explanation image based on the second ground information. The present disclosure can be applied to a medical image processing system.

17 Claims, 10 Drawing Sheets

(51) Int. Cl.
  *G06T 7/11*          (2017.01)
  *G06T 11/60*        (2006.01)
(52) U.S. Cl.
  CPC .... *G06T 11/60* (2013.01); *G06T 2207/20081*
      (2013.01); *G06T 2207/20084* (2013.01); *G06T*
          *2207/30096* (2013.01); *G06V 2201/03*
                                      (2022.01)
(58) Field of Classification Search
  CPC .................... G06T 7/0012; G06T 7/11; G06T
          2207/10068; G06T 2207/30032; G06V
              10/764; G06V 2201/03; G06V 10/87;
              G06V 10/945; A61B 5/00; G16H 30/40
  See application file for complete search history.

(56)                    References Cited

U.S. PATENT DOCUMENTS

2018/0247020 A1*  8/2018  Itu ......................... G16H 10/60
2020/0082943 A1    3/2020  Sakaguchi
2020/0242762 A1    7/2020  Matsuki et al.
2021/0012226 A1*  1/2021  Shi ...................... G06V 10/764

FOREIGN PATENT DOCUMENTS

JP          2020-042346  A      3/2020
JP          2020-112937  A      7/2020

* cited by examiner

F I G . 1
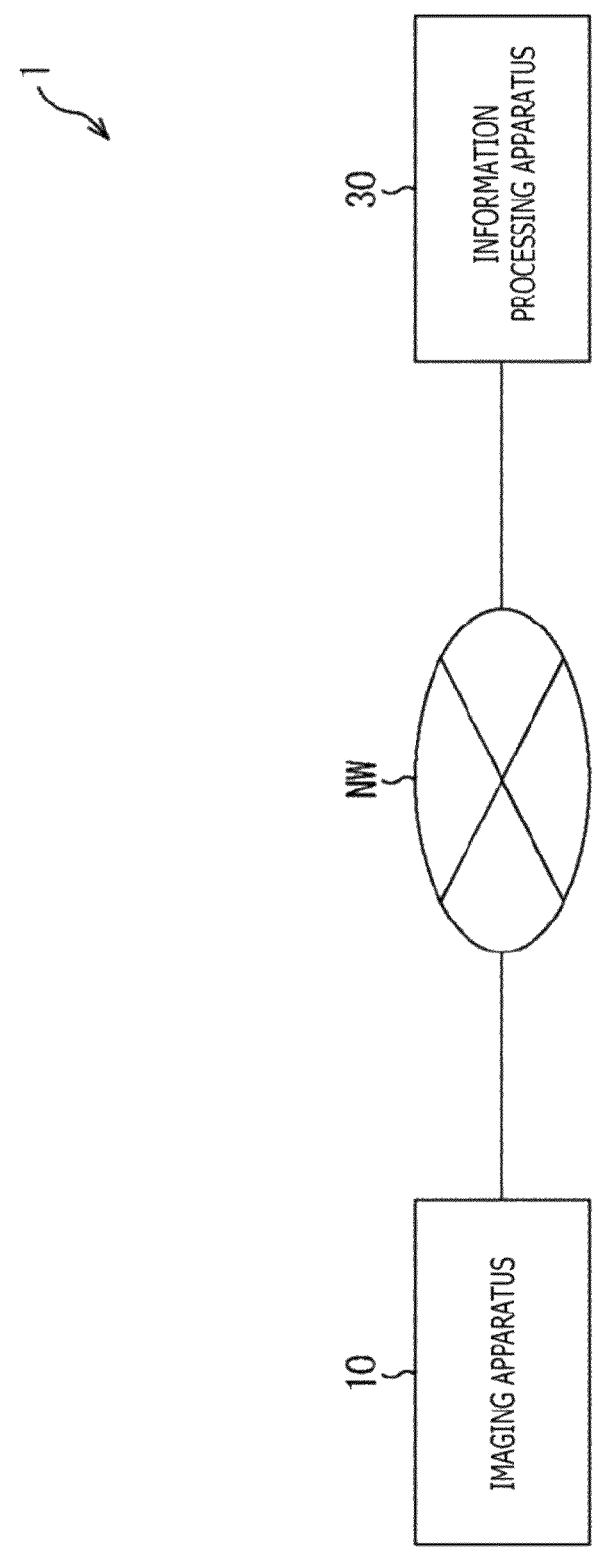

F I G . 3
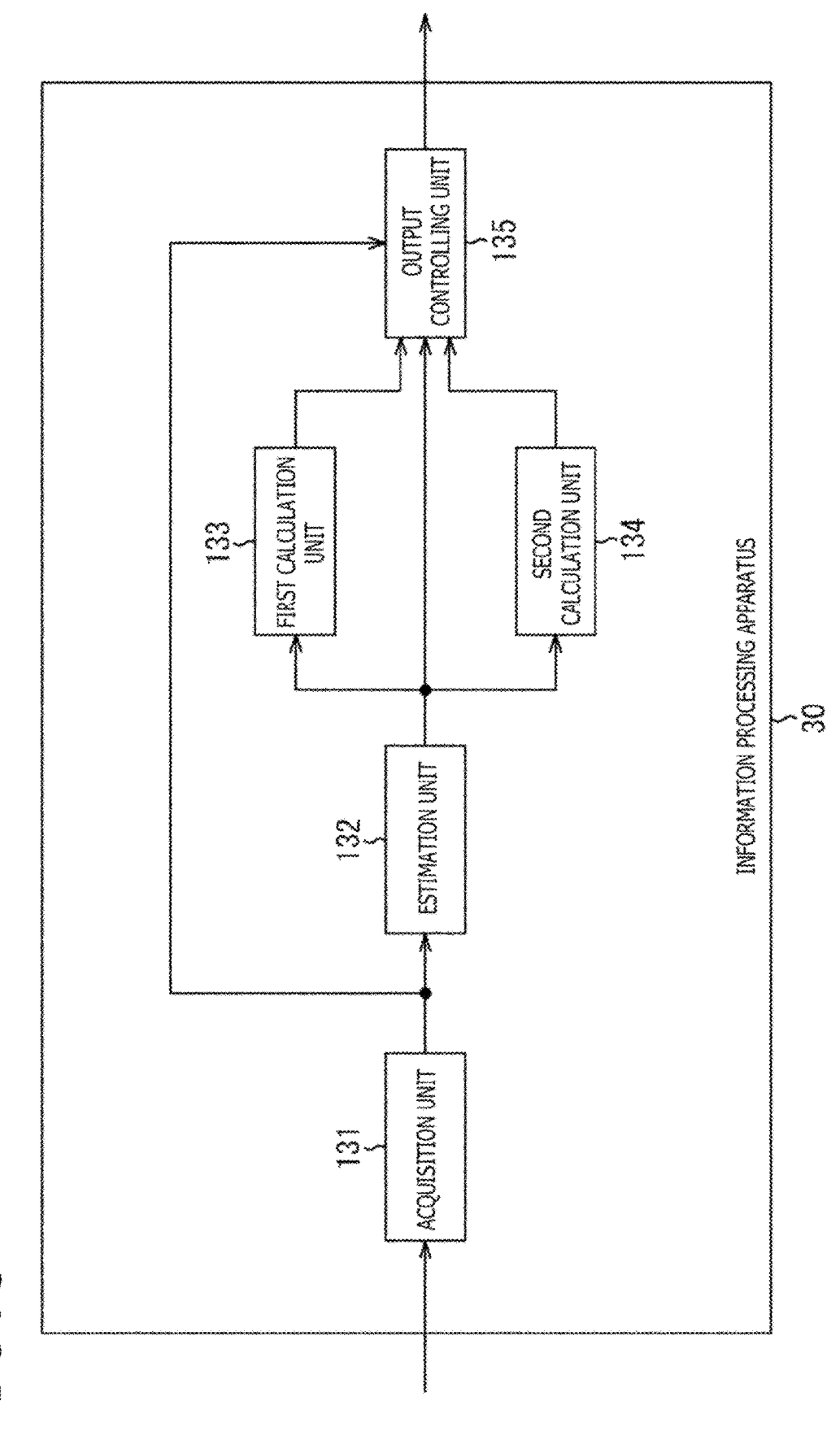

F I G . 5
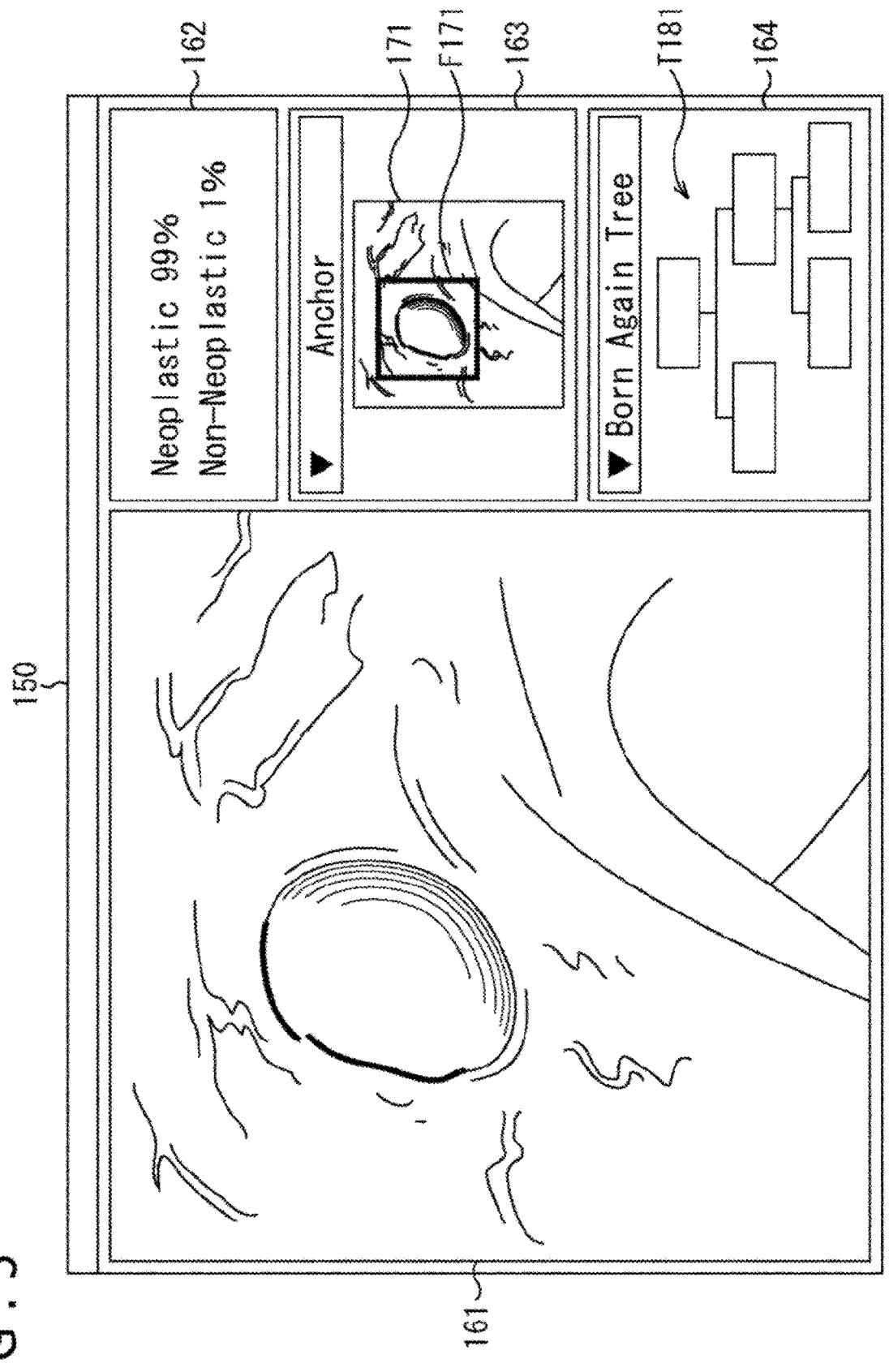

F I G . 7
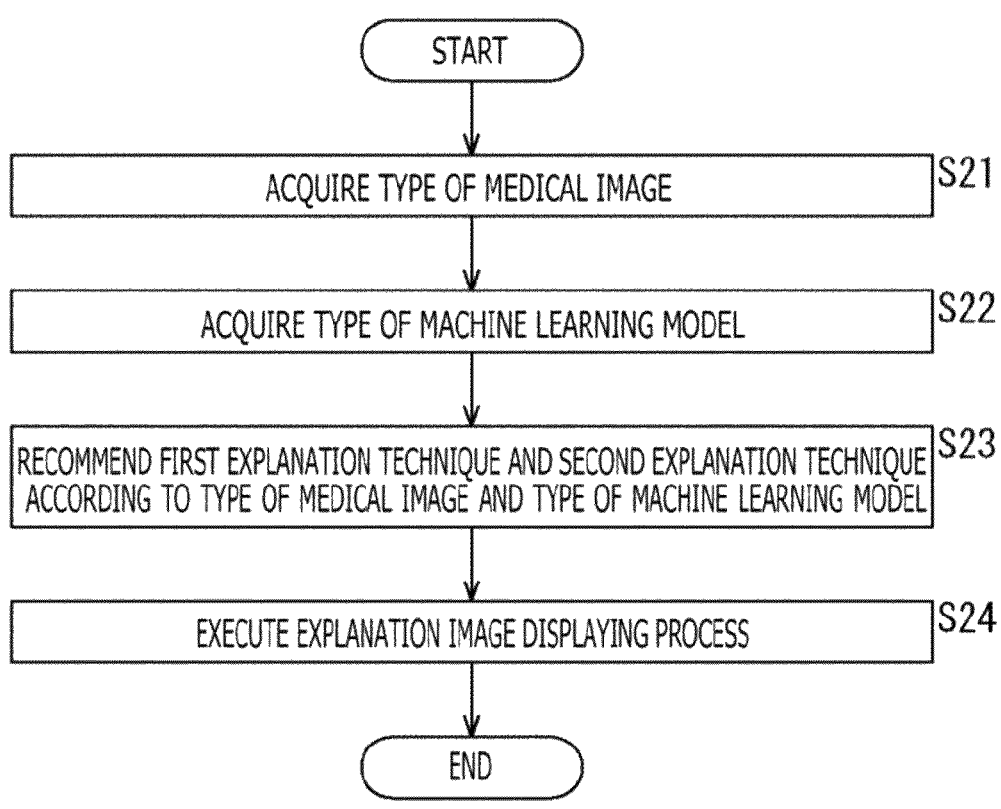

F I G . 8

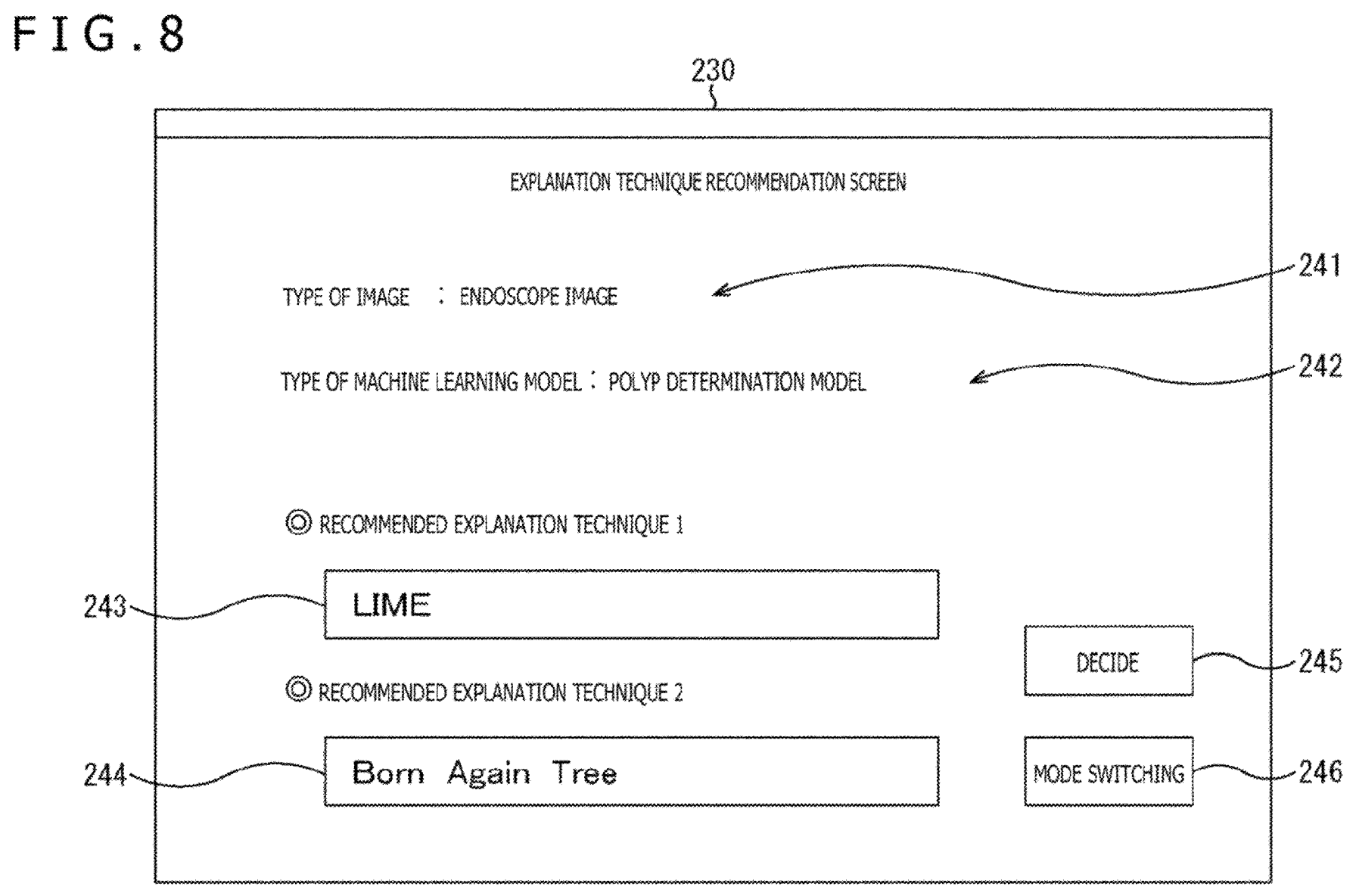

230

EXPLANATION TECHNIQUE RECOMMENDATION SCREEN

241

242

TYPE OF IMAGE : ENDOSCOPE IMAGE

TYPE OF MACHINE LEARNING MODEL : POLYP DETERMINATION MODEL

◎ RECOMMENDED EXPLANATION TECHNIQUE 1

LIME

243

◎ RECOMMENDED EXPLANATION TECHNIQUE 2

Born Again Tree

244

245

DECIDE

246

MODE SWITCHING

F I G . 9
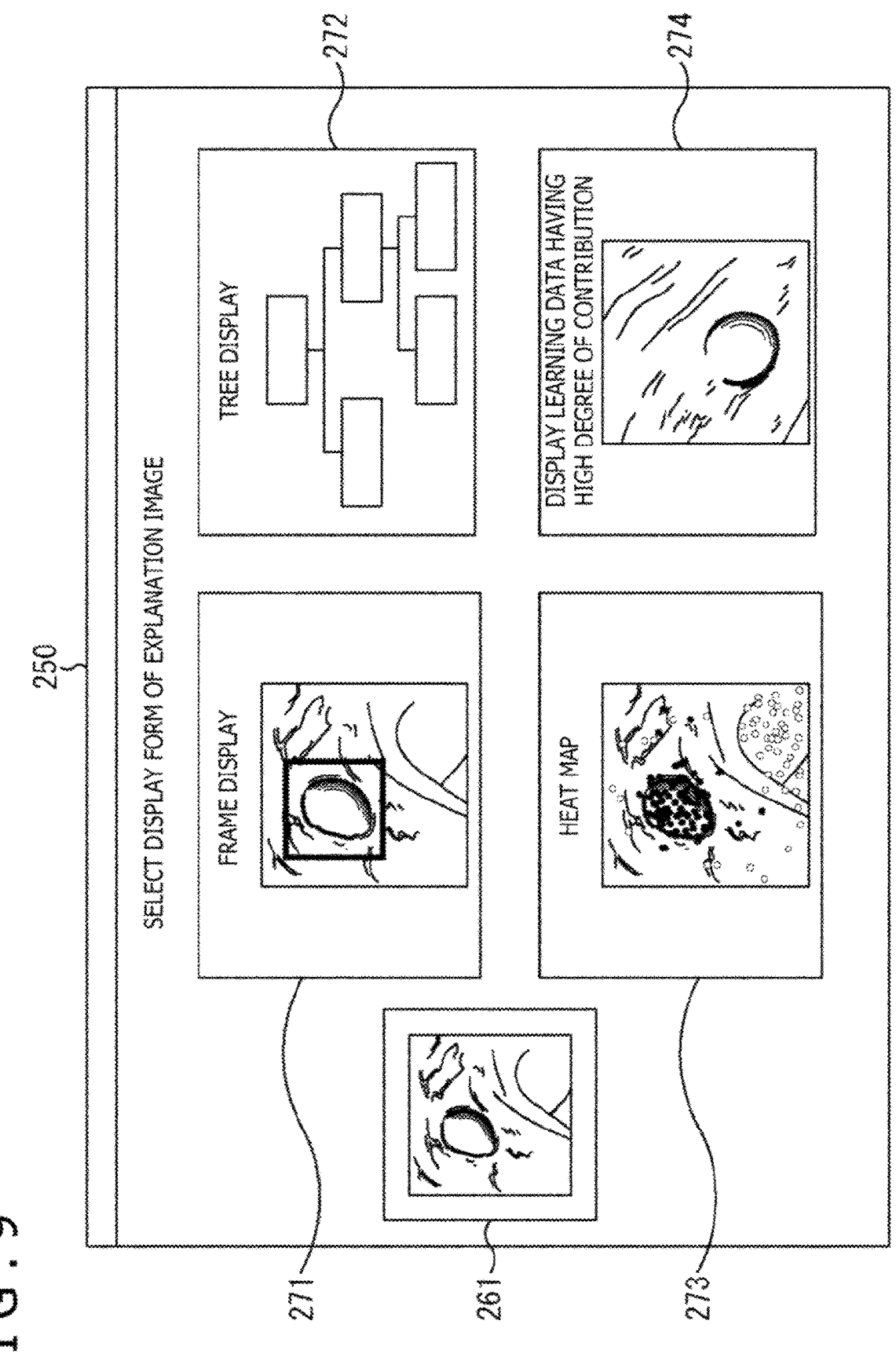

MEDICAL IMAGE PROCESSING SYSTEM, MEDICAL IMAGE PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2021/037274, filed in the Japanese Patent Office as a Receiving Office on Oct. 8, 2021, which claims priority to Japanese Patent Application Number JP2020-178138, filed in the Japanese Patent Office on Oct. 23, 2020, each of which is hereby incorporated by reference in its entirety.

TECHNICAL FIELD

The present disclosure relates to a medical image processing system, a medical image processing method, and a program, and particularly relates to a medical image processing system, a medical image processing method, and a program that facilitate understanding of a criterion or a reason of a determination made by a machine learning model.

BACKGROUND ART

In the field of medical care, diagnoses and operations that take advantage of AI (Artificial Intelligence) are increasing.

For example, PTL 1 discloses a medical system that adds an annotation to a pathological image by machine learning. Meanwhile, PTL 2 discloses an image processing method that detects a lesion in a CT image by machine learning.

However, since the determination made by a machine learning model configuring AI involves a great number of parameters, it is difficult for a human being to understand the criterion or the reason of the determination. Against this, study on XAI (Explainable AI) which can explain the criterion or the reason of determination by a machine learning model in such a manner that it can be understood by a human being is being advanced.

CITATION LIST

Patent Literature

[PTL 1]
Japanese Patent Laid-Open No. 2020-038600
[PTL 2]
Japanese Patent Laid-Open No. 2020-112937

SUMMARY

Technical Problem

Incidentally, variable techniques are available for XAI, and they are different in manner and accuracy of explanation depending upon the model. As a result, there is a possibility that a medical practitioner may not be able to understand the result of determination made by a machine learning model.

The present disclosure has been made in view of such a situation as described above and facilitates understanding of the criterion and the reason of a determination made by a machine learning model.

Solution to Problem

The medical image processing system of the present disclosure is a medical image processing system including an estimation unit that estimates classification of a medical image with use of a machine learning model, a first calculation unit that calculates first ground information indicative of estimation ground of the classification by a first explanation technique, a second calculation unit that calculates second ground information indicative of estimation ground of the classification by a second explanation technique different from the first explanation technique, and an output controlling unit that controls output of a first explanation image based on the first ground information and a second explanation image based on the second ground information.

The medical image processing method of the present disclosure is a medical image processing method executed by a medical image processing system, the method including estimating classification of a medical image with use of a machine learning model, calculating first ground information indicative of estimation ground of the classification by a first explanation technique, calculating second ground information indicative of estimation ground of the classification by a second explanation technique different from the first explanation technique, and controlling output of a first explanation image based on the first ground information and a second explanation image based on the second ground information.

The program of the present disclosure is a program for causing a computer to execute processes of estimating classification of a medical image with use of a machine learning model, calculating first ground information indicative of estimation ground of the classification by a first explanation technique, calculating second ground information indicative of estimation ground of the classification by a second explanation technique different from the first explanation technique, and controlling output of a first explanation image based on the first ground information and a second explanation image based on the second ground information.

In the present disclosure, classification of a medical image is estimated with use of a machine learning model, and first ground information indicative of estimation ground of the classification is calculated by a first explanation technique. Further, second ground information indicative of estimation ground of the classification is calculated by a second explanation technique different from the first explanation technique, and output of a first explanation image based on the first ground information and a second explanation image based on the second ground information is controlled.

BRIEF DESCRIPTION OF DRAWINGS

FIG. 1 is a block diagram depicting an example of a configuration of a medical image processing system to which the technology according to the present disclosure is applied.

FIG. 3 is a block diagram depicting an example of a functional configuration of the information processing apparatus according to a first embodiment.

FIG. 5 is a view depicting an example of an explanation image displaying screen.

FIG. 7 is a flow chart illustrating a flow of action of the image processing apparatus.

FIG. 8 is a view depicting an example of an explanation technique recommendation screen.

FIG. 9 is a view depicting an example of an explanation technique selection screen.

DESCRIPTION OF EMBODIMENTS

Figure 2:
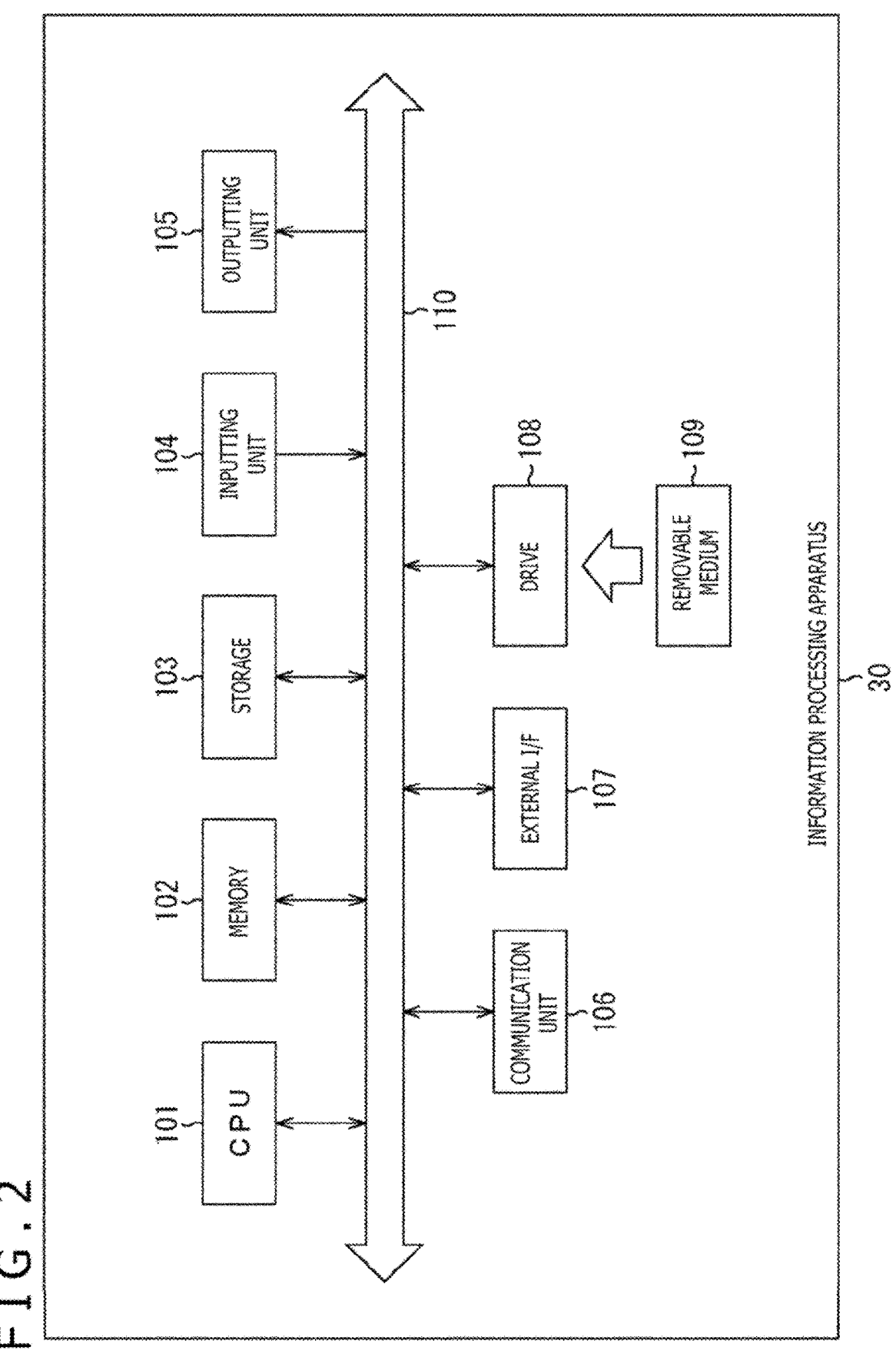
FIG. 2 is a block diagram depicting an example of a hardware configuration of an information processing apparatus.

In the following, modes for carrying out the present disclosure (hereinafter referred to as the embodiments) are described. The description is given in the following order.

1. Background
2. Configuration of Medical Image Processing System
3. Configuration of Image Processing Apparatus
4. First Embodiment (presentation of explanation image based on explanation technique selected in advance)
5. Second Embodiment (recommendation of explanation technique)
6. Program

1. Background

In the field of medical care, diagnoses and operations that take advantage of AI are increasing. However, a machine learning model configuring AI is so complicated that, even if the result of determination made by the AI can be understood by a human being, there is a case in which the reason of the determination cannot be understood. Especially, since a determination made by a machine learning model based on a neural network involves a great number of parameters, it is difficult for a human being to understand the criterion and the reason of the determination.

Against this, study on XAI which can explain the criterion and the reason of a determination made by a machine learning model, in such a manner that they can be understood by a human being, is being advanced. Variable techniques are available for XAI, and they are different in manner and accuracy of explanation depending upon the model. As a result, there is a possibility that a medical practitioner may not be able to easily understand the result of determination made by a machine learning model.

Hence, in the technology according to the present disclosure, facilitating understanding of the criterion and the reason of a determination made by a machine learning model is implemented by presentation of an explanation image based on multiple different explanation technologies of XAI.

In the present disclosure, a medical practitioner is a person who is engaged in medical care and performs a diagnosis, an operation, or the like of a patient and is not necessarily limited to a medical doctor or a pharmacist. For example, the medical practitioner includes a nurse, a dentist, a public health nurse, and so forth.

2. Configuration of Medical Image Processing System

FIG. 1 is a block diagram depicting an example of a configuration of a medical image processing system 1 to which the technology according to the present disclosure is applied.

The medical image processing system 1 includes an imaging apparatus 10 and an information processing apparatus 30. The imaging apparatus 10 and the information processing apparatus 30 are connected to each other through a network NW.

The imaging apparatus 10 is configured as a living body observation device such as an endoscope device or a microscope device for cell observation, for example, and captures an image of a biotissue as an imaging target. A captured image generated by imaging by the imaging apparatus 10 (hereinafter referred to as a medical image) is acquired by the information processing apparatus 30 through the network NW.

The information processing apparatus 30 is an information processing apparatus used by a medical practitioner and includes, for example, a PC (Personal Computer) or a tablet terminal. The information processing apparatus 30 acquires a medical image from the imaging apparatus 10 through the network NW and performs predetermined processes for the medical image. In particular, the information processing apparatus 30 estimates classification of the medical image from the imaging apparatus 10 with use of a machine learning model and presents an image representative of estimation ground of the classification and so forth to the medical practitioner.

3. Configuration of Information Processing Apparatus

FIG. 2 is a block diagram depicting an example of a hardware configuration of the information processing apparatus 30.

The information processing apparatus 30 includes a CPU (Central Processing Unit) 101, a memory 102, a storage 103, an inputting unit 104, an outputting unit 105, a communication unit 106, an external I/F 107, and a drive 108. The components ranging from the CPU 101 to the drive 108 are connected to a bus 110 and perform necessary communication with one another.

The CPU 101 executes programs installed in the memory 102 or the storage 103, to perform various processes.

The memory 102 includes, for example, a volatile memory and the like and temporarily stores a program to be executed by the CPU 101 and necessary data.

The storage 103 includes, for example, a hard disk or a nonvolatile memory and stores a program to be executed by the CPU 101 and necessary data.

The inputting unit 104 includes an operation unit including physical keys (including a keyboard), a mouse, a touch panel, and so forth, a microphone that collects sound, and so forth. The inputting unit 104 is used to output an operation signal and a sound signal corresponding to an operation made for the operation unit and sound collected by the microphone to the bus 110.

The outputting unit 105 is, for example, configured as a display device such as an LCD (Liquid Crystal Display) or an OELD (Organic Electro-Luminescence Display), a speaker that outputs sound, and so forth. The outputting unit 105 outputs an image, a character, or sound in response to data supplied thereto from the bus 110.

The touch panel that configures the inputting unit 104 includes a transparent member and can be configured integrally with the display device that configures the outputting unit 105. This makes it possible for a user (medical practitioner) to input information in such a form that an icon, a button, or the like displayed on the outputting unit 105 is operated.

The communication unit 106 includes a communication circuit, an antenna, and so forth and performs communication with the imaging apparatus 10 through the network NW.

The external I/F (interface) 107 is an interface for exchanging data with various external apparatuses.

The drive 108 allows, for example, mounting thereon and dismounting therefrom of a removable medium 109 such as a memory card and drives the removable medium 109 mounted thereon.

In the information processing apparatus 30 configured in such a manner as described above, a program to be executed by the CPU 101 can be recorded in advance in the storage 103 as a recording medium.

Otherwise, the program can be stored (recorded) into removable medium 109 and provided as what is generally called package software and can be installed into the information processing apparatus 30 from the removable medium 109.

Furthermore, it is possible to download the program from an unillustrated server or the like through the network NW and the communication unit 106 and install the program into the information processing apparatus 30.

In the following description, embodiments of the information processing apparatus 30 that has a function implemented by execution of a program installed therein by the CPU 101 are described.

4. First Embodiment (Example of Functional Configuration of Information Processing Apparatus)

FIG. 3 is a block diagram depicting an example of a functional configuration of the information processing apparatus 30 according to a first embodiment.

In the information processing apparatus 30, the CPU 101 executes a program installed therein to implement an acquisition unit 131, an estimation unit 132, a first calculation unit 133, a second calculation unit 134, and an output controlling unit 135.

The acquisition unit 131 controls the communication unit 106 to acquire a medical image from the imaging apparatus 10 through the network NW and supplies the medical image to the estimation unit 132 and the output controlling unit 135.

The estimation unit 132 estimates classification of a medical image from the acquisition unit 131 with use of a predetermined machine learning model. Details of the classification of a medical image are described later. An estimation result of the classification of the medical image is supplied to the first calculation unit 133, the second calculation unit 134, and the output controlling unit 135.

The first calculation unit 133 calculates, according to the estimation result from the estimation unit 132, first ground information indicative of estimation ground of the classification of the medical image by a first explanation technique that explains estimation ground of a machine learning model used in the estimation of the classification of the medical image. The calculated first ground information is supplied to the output controlling unit 135.

The second calculation unit 134 calculates, according to the estimation result from the estimation unit 132, second ground information indicative of estimation ground of the classification of the medical image by a second explanation technique that explains estimation ground of the machine learning model used in the estimation of the classification of the medical image. The second explanation technique is an explanation technique different from the first explanation technique. The calculated second ground information is supplied to the output controlling unit 135.

The output controlling unit 135 controls output of a first explanation image based on the first ground information from the first calculation unit 133 and a second explanation image based on the second ground information from the second calculation unit 134. The first explanation image is such an image as representing estimation ground of the first explanation technique. The second explanation image is such an image as representing estimation ground of the second explanation technique.

Further, the output controlling unit 135 controls output of the medical image from the acquisition unit 131 and the estimation result of the classification of the medical image from the estimation unit 132 in addition to the first explanation image and the second explanation image.

Consequently, an explanation image displaying screen that includes the medical image and the estimation result of the classification of the medical image as well as the first explanation image and the second explanation image is displayed on the display device that configures the outputting unit 105.

(Flow of Explanation Image Displaying Process)

Now, a flow of the explanation image displaying process executed by the information processing apparatus 30 of FIG. 3 is described with reference to a flow chart of FIG. 4.

In step S11, the acquisition unit 131 acquires a medical image from the imaging apparatus 10 through the network NW. The medical image may, for example, be acquired otherwise from an external apparatus other than the imaging apparatus 10 such as a cloud storage.

In step S12, the estimation unit 132 estimates classification of the medical image acquired from the imaging apparatus 10, with use of a predetermined machine learning model.

The classification of the medical image indicates whether or not a lesion is included in the medical image. For example, in a case where the medical image is an endoscope image, classification of whether or not a malignant polyp is included as an imaging target in the endoscope image is estimated. The machine learning model here includes parameters generated by, for example, a learning data group, which includes medical images and labels of classification of them in sets, being input to the machine learning model, which includes a neural network, to be learned.

In step S13, the first calculation unit 133 calculates first ground information indicative of estimation ground of the classification of the medical image by the first explanation technique.

The first explanation technique is a technique that presents estimation ground of a machine learning model in regard to specific input data and is, for example, a local explanation technique that presents a feature amount and learning data that have become estimation ground of the machine learning model of the estimation unit 132. In this case, the first explanation technique is such an algorithm as LIME, SHAP, Anchor, or influence, for example. In particular, the first ground information is, for example, information that indicates a region having an image and a feature amount of the image as learning data that becomes the estimation ground of the machine learning model presented by the first explanation technique.

In this case, in the first explanation technique, for example, the medical image is divided for each predetermined region, and the predetermined regions are sequentially replaced into a dummy image and inputted to the estimation unit 132. A region that is replaced into a dummy image when the result of estimation made by the estimation unit 132 indicates a great amount of difference is estimated as a region that has a feature amount having a strong influence on the estimation of the estimation unit 132. At this time, the first ground information is information indicative of the region that has the feature amount having a strong influence on the estimation of the estimation unit 132 (feature amount that contributes to the estimation result of the classification).

In step S14, the second calculation unit 134 calculates second ground information indicative of estimation ground of the classification of the medical image by the second explanation technique that is different from the first explanation technique.

The second explanation technique is a technique of presenting estimation ground of a machine learning model in regard to specific input data and is, for example, a comprehensive explanation technique of representing a complicated machine learning model with a highly readable and interpretable model. In this case, the second explanation technique is, for example, such an algorithm as Born Again Tree.

In this case, in the second explanation technique, a test data group to which multiple labels prepared in advance are given is inputted to the machine learning model of the estimation unit 132, and an estimation result is calculated by the estimation unit 132, and then, a decision tree is generated according to the test data group and the result of estimation made by the estimation unit 132. In particular, a decision tree approximated to the machine learning model of the estimation unit 132 is generated. Consequently, by inputting an image similar to the medical image inputted to the estimation unit 132 to the decision tree, the information (label) that has been made ground of the estimation by the decision tree can be approximated to the estimation ground of the machine learning model of the estimation unit 132. At this time, the second ground information is the label of the decision tree that has become the ground of the estimation by the decision tree.

In step S15, the output controlling unit 135 controls the display device that configures the outputting unit 105 to display an explanation image displaying screen that includes the medical image and the estimation result of the classification of the medical image, a first explanation image based on the first ground information, and a second explanation image based on the second ground information.

For example, the first explanation image is an image in which the explanation information generated in reference to the first ground information is superposed on the medical image. Meanwhile, the second explanation image is an image that represents the decision tree generated in reference to the second ground information.

FIG. 5 is a view depicting an example of the explanation image displaying screen that is displayed on the display device that configures the outputting unit 105.

In a left side region of the explanation image displaying screen 150 depicted in FIG. 5, a medical image 161 acquired from the imaging apparatus 10 is displayed. In a right side region of the explanation image displaying screen 150, an estimation result 162, a first explanation image 163, and a second explanation image 164 are displayed in order from above.

In the estimation result 162, it is indicated, as the estimation result of the classification of the medical image 161, that the possibility that the medical image 161 includes a lesion (malignant polyp) is 99% and the possibility that the medical image 161 includes no lesion is 1%.

In the first explanation image 163, a frame F171 that defines a region that has a feature amount that is indicated by the first ground information and that has been made the ground of the estimation by the estimation unit 132 is displayed in a superposed relation with a medical image 171 similarly to the medical image 161. Further, in the first explanation image 163, it is indicated that Anchor has been used as the first explanation technique.

In the second explanation image 164, a decision tree T181 generated in reference to the second ground information is displayed. Further, in the second explanation image 164, it is indicated that Born Again Tree has been used as the second explanation technique.

It is to be noted that, in the present embodiment, the first explanation technique and the second explanation technique are made to be selectable in advance by a medical practitioner who handles the information processing apparatus 30.

According to the processes described above, the explanation image displaying screen makes it possible for the medical practitioner to multilaterally recognize a result of estimation made by a machine learning model, by checking an explanation image that is based not only on a result of estimation made by the machine learning model but also on explanation images based on multiple different explanation techniques. As a result, it is possible to make it easy for the medical practitioner to understand the criterion and the reason of a determination made by the machine learning model.

In the foregoing description, it is described that the first explanation technique is a local explanation technique and the second explanation technique is a comprehensive explanation technique. This is not restrictive, and it is sufficient only if the algorithm of the first explanation technique and the algorithm of the second explanation technique are different from each other. Hence, each of the first explanation technique and the second explanation technique may be a local explanation technique, or each of the first explanation technique and the second explanation technique may be a comprehensive explanation technique.

Further, the first explanation technique and the second explanation technique may be techniques other than the explanation techniques described above, and, for example, may be explanation techniques that explain estimation ground from a medical image by a natural language.

5. Second Embodiment

In the description of the embodiment described above, it is described that, while the information processing apparatus 30 presents a result of estimation made by the estimation unit 132 to a medical practitioner by multiple explanation techniques, the first explanation technique and the second explanation technique are selected in advance by the medical practitioner who handles the information processing apparatus 30.

However, a medical practitioner who handles the information processing apparatus 30 may not necessarily be familiar with a machine learning model, and there is assumed a case in which it is difficult for a medical practitioner to determine which explanation techniques are to be selected.

Hence, the embodiment described below is configured such that a recommendation can be given to a medical practitioner as to which ones of explanation techniques are to be selected.

(Example of Functional Configuration of Information Processing Apparatus)

Figure 6:
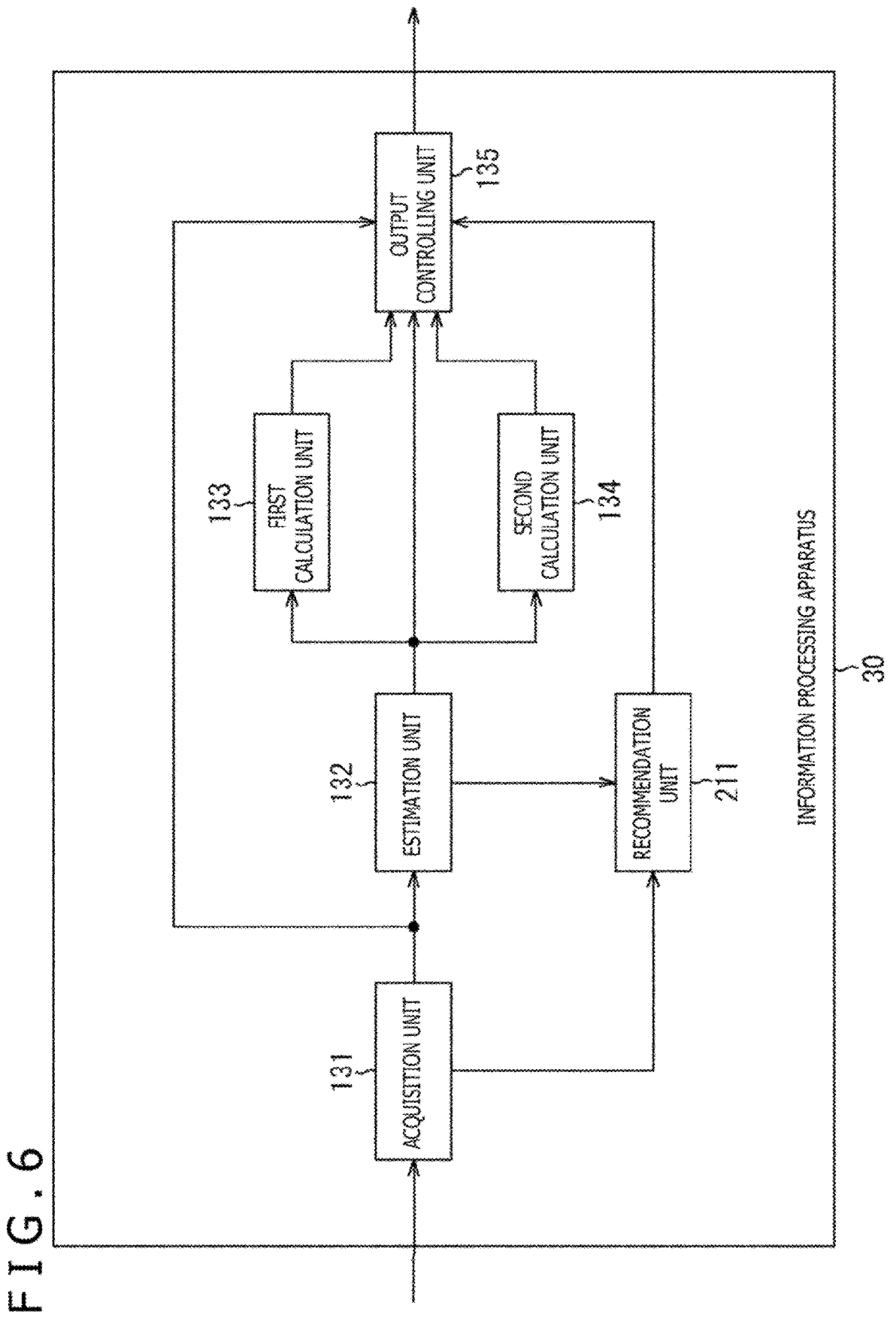
FIG. 6 is a block diagram depicting an example of a functional configuration of the information processing apparatus according to a second embodiment.

FIG. 6 is a block diagram depicting an example of a functional configuration of the information processing apparatus 30 according to the second embodiment.

The information processing apparatus 30 of FIG. 6 includes, in addition to functional blocks similar to those of the information processing apparatus 30 of FIG. 3, a recommendation unit 211 that recommends an explanation technique to a medical practitioner.

The recommendation unit 211 recommends a first explanation technique and a second explanation technique to a user (medical practitioner) according to the type of a medical image from the imaging apparatus 10. The explanation techniques to be recommended are displayed on the display device configuring the outputting unit 105 by the output controlling unit 135.

(Flow of Action of Information Processing Apparatus)

Now, a flow of action of the information processing apparatus 30 of FIG. 6 that has the recommendation function for an explanation technique is described with reference to the flow chart of FIG. 4.

In step S21, the acquisition unit 131 acquires a type of a medical image in reference to information (metadata) regarding a medical image selected by a medical practitioner.

The metadata of the medical image is data indicative of by what kind of imaging apparatus 10 the medical image has been captured or what attribute the medical image has. The metadata of the medical image is, for example, DICOM information.

In particular, in a case where the imaging apparatus 10 is an endoscope device, the metadata indicates that the type of the medical image is an endoscope image, and in a case where the imaging apparatus 10 is a microscope device, the metadata indicates that the type of the medical image is a microscope image. The acquired type of the medical image is supplied to the recommendation unit 211.

In step S22, the recommendation unit 211 acquires a type of a machine learning model of the estimation unit 132 from the estimation unit 132.

The type of the machine learning model indicates a type of an image for which determination is performed by the machine learning model and a type of determination to be performed by the machine learning model. For example, the type of the machine learning model indicates that it is a polyp determination model of an endoscope image.

In step S23, the recommendation unit 211 recommends a first explanation technique and a second explanation technique according to the type of the medical image and the type of the machine learning model. In particular, the recommendation unit 211 generates recommendation information for recommending the first explanation technique and the second explanation technique, and the output controlling unit 135 controls the display device configuring the outputting unit 105, to display an explanation technique recommendation screen based on the generated recommendation information.

FIG. 8 is a view depicting an example of the explanation technique recommendation screen.

In the upper stage of the explanation technique recommendation screen 230 of FIG. 8, a type 241 of the medical image and a type 242 of the machine learning model are displayed. In the example of FIG. 8, it is indicated that the type 241 of the medical image is an endoscope image and that the type 242 of the machine learning model is a polyp determination model of an endoscope image.

In the lower stage of the explanation technique recommendation screen 230 of FIG. 8, there are provided display regions 243 and 244 in which a first explanation technique and a second explanation technique recommended according to the type 241 of the medical image and the type 242 of the machine learning model are displayed, respectively. In the display regions 243 and 244, there are displayed explanation techniques which are linked to the type of the medical image and the type of the machine learning model in a table stored in advance.

In the example of FIG. 8, in the display region 243, LIME is displayed as the first explanation technique linked to the endoscope image and the polyp determination model of the endoscope image. Meanwhile, a Born Again Tree is displayed as the second explanation technique linked to the endoscope image and the polyp determination model of the endoscope image.

At a lower right portion of the explanation technique recommendation screen 230 of FIG. 8, a decision button 245 is provided.

If the decision button 245 is pressed by a medical practitioner, then the explanation techniques (algorithms) displayed in the display regions 243 and 244 are determined as the first explanation technique and the second explanation technique, respectively, and the processing advances to step S24.

Figure 4:
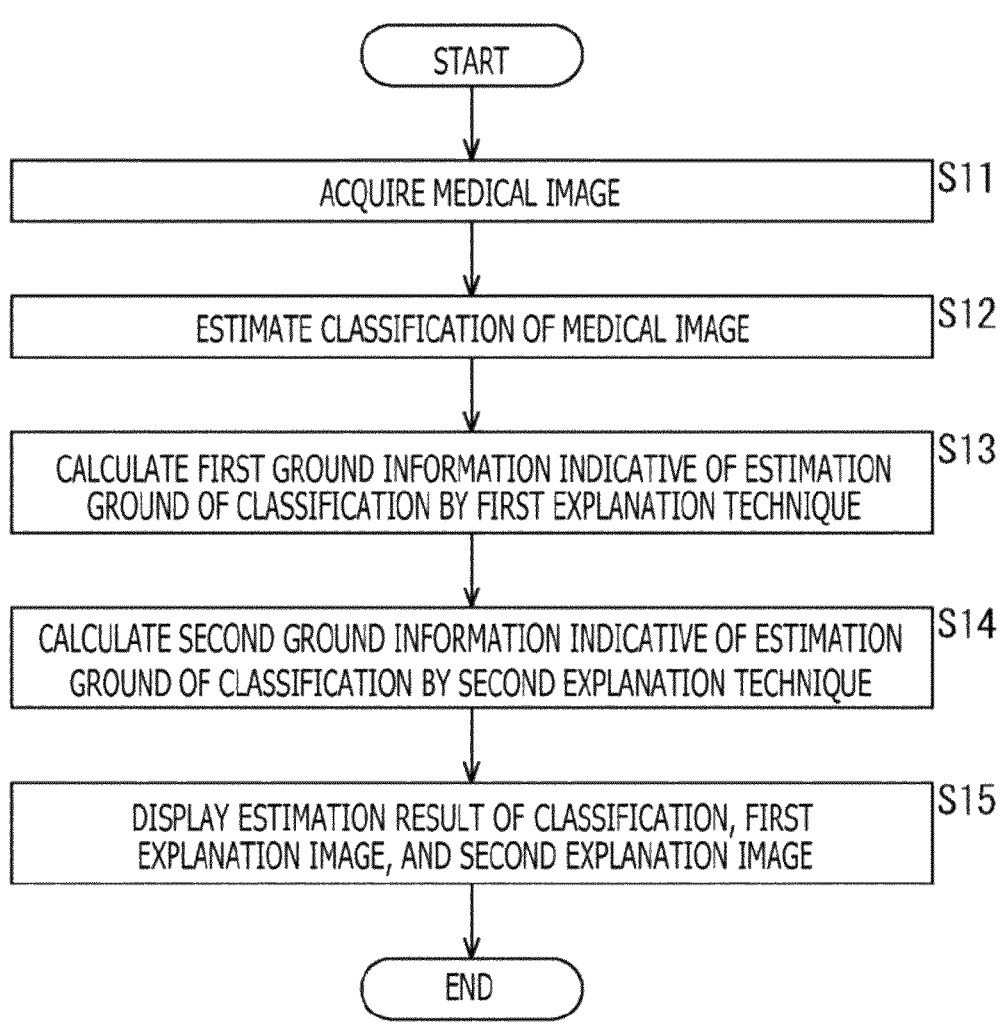
FIG. 4 is a flow chart illustrating a flow of an explanation image displaying process.

In step S24, the explanation image displaying process described hereinabove with reference to FIG. 4 is executed. Here, an explanation image based on the first explanation technique and the second explanation technique recommended in step S23 is displayed.

Further, a mode switching button 246 may be provided at a lower right portion of the explanation technique recommendation screen 230 of FIG. 8. In a case where the mode switching button 246 is pressed by a medical practitioner, the mode for recommending the first explanation technique and the second explanation technique is switched. For example, a first mode for recommending two different explanation techniques and a second mode for recommending two explanation techniques having comparatively high degrees of accuracy are prepared, and by the mode switching button 246 being pressed, switching between the first mode and the second mode can be performed.

According to the processes described above, since explanation techniques according to the type of a medical image and the type of a machine learning model are recommended, even a medical practitioner who is not familiar with a machine learning model can handle the information processing apparatus 30 without confusion.

(Other Examples of Screen Display)

In addition to the explanation technique recommendation screen described above, there may be displayed a different explanation technique recommendation screen which simply presents in what manner an explanation image (estimation ground of a machine learning model) is displayed, to allow a medical practitioner to select an explanation technique.

FIG. 9 is a view depicting an example of an explanation technique selection screen that is displayed when a first explanation technique and a second explanation technique are recommended.

At a right end of the explanation image selection screen 250 of FIG. 9, there is provided a medical image displaying region 261 in which a medical image that becomes a sample is displayed.

On a right side in the medical image displaying region 261, sample image displaying regions 271 to 274 arrayed in 2 vertical×2 horizontal are provided. In each of the sample image displaying regions 271 to 274, a sample image that depicts a displaying form of a first explanation technique and a second explanation technique in a simplified manner is displayed.

In particular, in the sample image displaying region 271, there is displayed a sample image in which a frame that encloses a region having a feature amount that becomes estimation ground is superposed on a medical image of the medical image displaying region 261. In the sample image displaying region 272, there is displayed a sample image which represents a decision tree approximated to the machine learning model of the estimation unit 132.

In the sample image displaying region 273, there is displayed a sample image in which a heat map according to a feature amount that becomes estimation ground is superposed on the medical image of the medical image displaying region 261. In the sample image displaying region 274, an example of learning data that is high in contribution degree to estimation of the estimation unit 132 is displayed as a sample image.

In such a manner, if a medical practitioner selects a sample image that is easy for him/her to understand from among the sample image displaying regions 271 to 274 on the explanation image selection screen 250, then it is possible for the medical practitioner to more easily understand the criterion and the reason of a determination made by the machine learning model.

Further, a first explanation technique and a second explanation technique may be recommended within a range of a predetermined condition set by the medical practitioner.

Figure 10:
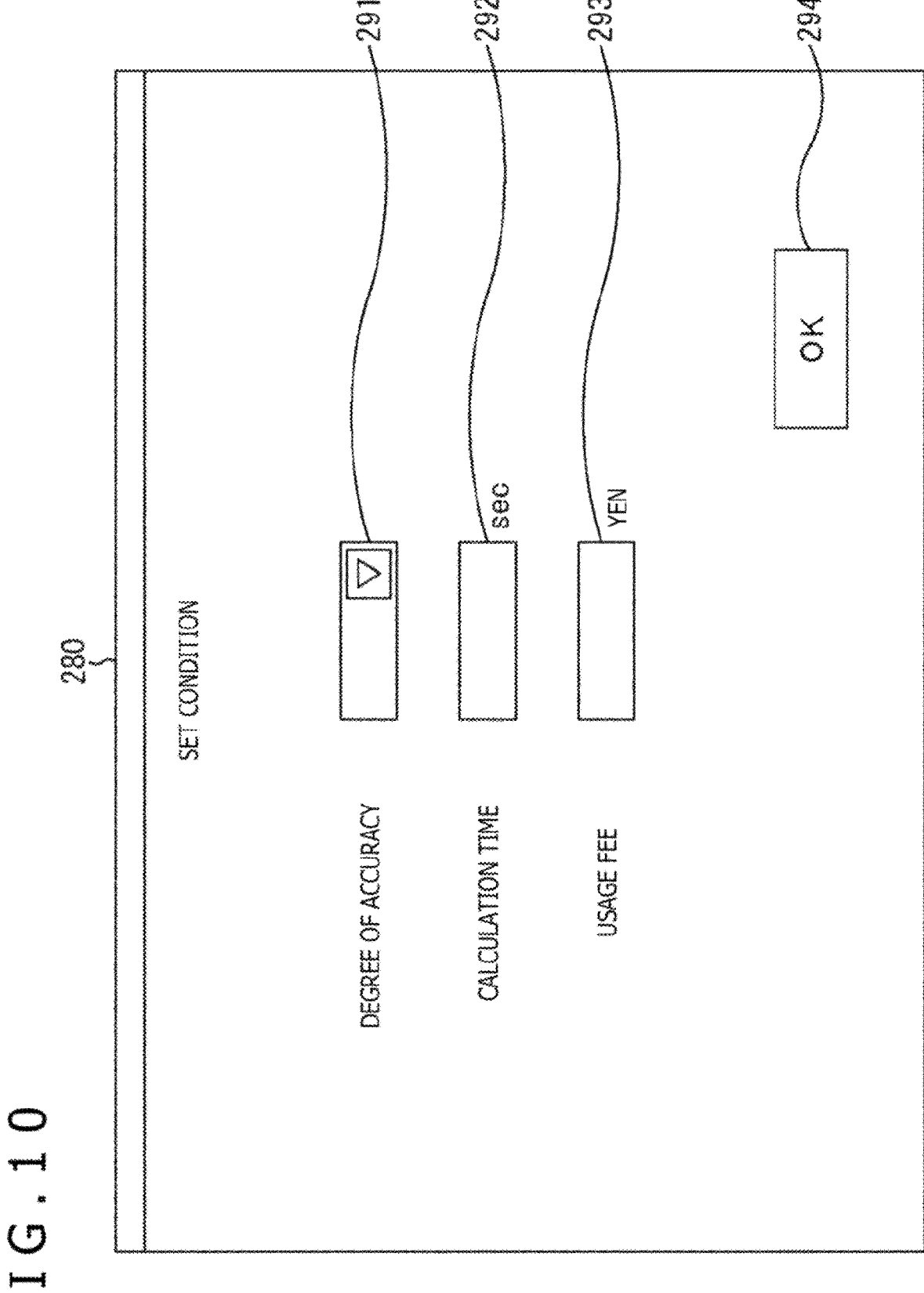
FIG. 10 is a view depicting an example of a condition setting screen.

FIG. 10 is a view depicting an example of a recommendation condition setting screen for setting a recommendation condition for an explanation technique.

A recommendation condition setting screen 280 of FIG. 10 is displayed, for example, before the explanation technique recommendation screen 230 of FIG. 8 and the explanation image selection screen 250 of FIG. 9 are displayed.

In the recommendation condition setting screen 280, an accuracy selection portion 291, a calculation time inputting portion 292, a usage fee inputting portion 293, and an OK button 294 are provided.

The accuracy selection portion 291 is a GUI control that is operated in order to select a degree of accuracy of an explanation technique as a recommendation condition for the explanation technique and is configured, for example, as a dropdown list. In the accuracy selection portion 291, such values (choices) as "high," "medium," and "low" each representing a degree of accuracy of an explanation technique are, for example, displayed, and if a medical practitioner selects a desired one of the values, then the degree of accuracy of an explanation technique that is made a recommendation condition is set.

The calculation time inputting portion 292 is a GUI control that is operated in order to input, as a recommendation condition for an explanation technique, a period of time required for calculation of estimation ground (ground information), and is configured, for example, as a text box. If a desired period of time is inputted to the calculation time inputting portion 292 by a medical practitioner, then a period of time for calculation of estimation ground to be made a recommendation condition is set.

The usage fee inputting portion 293 is a GUI control that is operated in order to input, as a recommendation condition for an explanation technique, an upper limit for the usage fee for an explanation technique, and is configured, for example, as a text box. If a desired amount of money is inputted to the usage fee inputting portion 293 by a medical practitioner, then an upper limit of the usage fee for an explanation technique to be made a recommendation condition is set.

The OK button 294 is a button that is operated in order to decide recommendation conditions for an explanation technique set by the accuracy selection portion 291, the calculation time inputting portion 292, and the usage fee inputting portion 293. If the OK button 294 is operated, then the degree of accuracy of an explanation technique, the period of time required for calculation of estimation ground, and the upper limit of a usage condition for the explanation technique are decided.

If a medical practitioner sets recommendation conditions for an explanation technique on the recommendation condition setting screen 280 in such a manner, then explanation techniques that satisfy conditions desired by the medical practitioner can be recommended to the medical practitioner.

In addition, explanation techniques selected by a greater number of other users (medical practitioners) in regard to a medical image of the same type as the medical images captured by the imaging apparatus 10 may be recommended as the first explanation technique and the second explanation technique.

6. Program

In the present specification, processes to be performed in accordance with a program by a computer (CPU) is not necessarily required to be performed chronologically in the order described in the flow charts. In particular, processes performed in accordance with a program by a computer include processes that are executed in parallel or individually (for example, by parallel processing or by processing by an object).

Further, the program may be processed by a single computer (processor) or may be processed in a distributed manner by multiple computers. Moreover, the program may be transferred to and executed by a remote computer.

Further, in the present specification, the term system signifies an aggregate of multiple components (devices, modules (parts), and so forth) and it does not matter whether or not all components are included in the same housing. Accordingly, multiple apparatuses that are accommodated in different housings and are connected to each other through a network and a single apparatus that includes multiple modules accommodated in a single housing are both systems.

It is to be noted that the embodiment of the present disclosure is not limited to the embodiments described above and various alterations are possible without departing from the subject matter of the present disclosure.

Further, for example, the technology according to the present disclosure can take a configuration for cloud computing in which one function is shared and processed cooperatively by multiple apparatuses through a network.

Further, it is possible for the steps described above with reference to the flow charts to be executed not only by a single apparatus and but also in a shared manner by multiple apparatuses.

Further, in a case where multiple processes are included in one step, the multiple processes included in the one step can not only be executed by a single apparatus but also be executed in a shared manner by multiple apparatuses.

Further, the advantageous effects described in the present specification are exemplary to the last and are not restrictive, and other advantageous effects may be available.

Furthermore, the present disclosure can take such configurations as described below.

(1)

A medical image processing system including:

an estimation unit that estimates classification of a medical image with use of a machine learning model;

a first calculation unit that calculates first ground information indicative of estimation ground of the classification by a first explanation technique;

a second calculation unit that calculates second ground information indicative of estimation ground of the classification by a second explanation technique different from the first explanation technique; and an output controlling unit that controls output of a first explanation image based on the first ground information and a second explanation image based on the second ground information.

(2)

The medical image processing system according to (1) above, in which the classification indicates whether or not the medical image includes a lesion.

(3)

The medical image processing system according to (1) or (2) above, in which the first explanation technique is a local explanation technique of the machine learning model, and the second explanation technique is a comprehensive explanation technique of the machine learning model.

(4)

The medical image processing system according to (3) above, in which the first explanation image is an image in which explanation information based on the first ground information is superposed on the medical image, and the second examination image is an image that represents a decision tree corresponding to the machine learning model generated in reference to the second ground information.

(5)

The medical image processing system according to (4) above, in which the first ground information includes information representative of a feature amount that contributes to an estimation result of the classification, and the second ground information includes a label of the decision tree.

(6)

The medical image processing system according to (1) or (2) above, in which the first explanation technique and the second explanation technique are both the local explanation technique of the machine learning model.

(7)

The medical image processing system according to (1) or (2) above, in which the first explanation technique and the second explanation technique are both the comprehensive explanation technique of the machine learning model.

(8)

The medical image processing system according to any one of (1) to (7) above, in which the output controlling unit controls output of an estimation result of the classification in addition to the first explanation image and the second explanation image.

(9)

The medical image processing system according to any one of (1) to (8) above, in which the first explanation technique and the second explanation technique are selectable in advance by a user.

(10)

The medical image processing system according to any one of (1) to (8) above, further including:

a recommendation unit that recommends the first explanation technique and the second explanation technique to a user according to a type of the medical image.

(11)

The medical image processing system according to (10) above, in which the type of the medical image is acquired in reference to metadata of the medical image.

(12)

The medical image processing system according to (10) or (11) above, in which the recommendation unit recommends the first explanation technique and the second explanation technique according to the type of the medical image and a type of the machine learning model.

(13)

The medical image processing system according to (10) above, in which the recommendation unit recommends the first explanation technique and the second explanation technique by one of a first mode by which two different explanation techniques are recommended and a second mode by which two explanation techniques that have higher ranks in accuracy are recommended.

(14)

The medical image processing system according to (13) above, in which the first mode and the second mode are switchable by the user.

(15)

The medical image processing system according to any one of (10) to (14) above, in which the output controlling unit controls output of a sample image that indicates a display form of the first explanation image and the second explanation image in a simplified manner when the first explanation technique and the second explanation technique are to be recommended.

(16)

The medical image processing system according to any one of (10) to (15) above, in which the recommendation unit recommends the first explanation technique and the second explanation technique within a range of a condition set by the user.

(17)

The medical image processing system according to (16) above, in which the condition includes at least one of a degree of accuracy of the explanation technique, a period of time required for calculation of ground information, and a usage fee for the explanation techniques.

(18)

The medical image processing system according to (10) above, in which the recommendation unit recommends explanation techniques selected by a greater number of other users in regard to the medical image of a type same as that of the medical image as the first explanation technique and the second explanation technique.

(19)

A medical image processing method executed by a medical image processing system, including:

estimating classification of a medical image with use of a machine learning model;

calculating first ground information indicative of estimation ground of the classification by a first explanation technique;

calculating second ground information indicative of estimation ground of the classification by a second explanation technique different from the first explanation technique; and controlling output of a first explanation image based on the first ground information and a second explanation image based on the second ground information.

(20)

A program for causing a computer to execute processes of:

estimating classification of a medical image with use of a machine learning model;

calculating first ground information indicative of estimation ground of the classification by a first explanation technique;

calculating second ground information indicative of estimation ground of the classification by a second explanation technique different from the first explanation technique; and controlling output of a first explanation image based on the first ground information and a second explanation image based on the second ground information.

REFERENCE SIGNS LIST

1: Medical image processing system
10 Imaging apparatus
30 Information processing apparatus
101: CPU
105: Outputting unit
131: Acquisition unit
132: Estimation unit
113: First calculation unit
134: Second calculation unit
135: Output controlling unit
211: Recommendation unit

The invention claimed is:

1. A medical image processing system, comprising:

processing circuitry configured to estimate classification of a medical image with use of a machine learning model, calculate first ground information indicative of estimation ground of the classification by a first explanation technique in which a medical image is divided into predetermined regions and each predetermined region is sequentially replaced into a dummy image as input for the estimation, wherein the first ground information is indicative of the predetermined region including the feature amount that contributes to the estimation result of the classification, calculate second ground information indicative of estimation ground of the classification by a second explanation technique different from the first explanation technique, control output of a first explanation image based on the first ground information in which explanation information based on the first ground information is superposed on the medical image and a second explanation image based on the second ground information, and determine the first explanation technique and the second explanation technique to a user according to a type of the medical image, wherein the first explanation technique and the second explanation technique are determined by one of a first mode by which two different explanation techniques are recommended and a second mode by which two explanation techniques that have higher ranks in accuracy are recommended, and wherein the first mode and the second mode are switchable by the user.

2. The medical image processing system according to claim 1, wherein the classification indicates whether or not the medical image includes a lesion.

3. The medical image processing system according to claim 1, wherein the second explanation technique is a comprehensive explanation technique of the machine learning model.

4. The medical image processing system according to claim 3, wherein the first explanation image is an image in which explanation information based on the first ground information is superposed on the medical image, and the second examination image is an image that represents a decision tree corresponding to the machine learning model generated in reference to the second ground information.

5. The medical image processing system according to claim 4, wherein the first ground information includes information representative of a feature amount that contributes to an estimation result of the classification, and the second ground information includes a label of the decision tree.

6. The medical image processing system according to claim 1, wherein the first explanation technique and the second explanation technique are both a local explanation technique of the machine learning model.

7. The medical image processing system according to claim 1, wherein the first explanation technique and the second explanation technique are both a comprehensive explanation technique of the machine learning model.

8. The medical image processing system according to claim 1, wherein the output controller controls output of an estimation result of the classification in addition to the first explanation image and the second explanation image.

9. The medical image processing system according to claim 1, wherein the first explanation technique and the second explanation technique are selectable in advance by a user.

10. The medical image processing system according to claim 1, wherein the type of the medical image is acquired in reference to metadata of the medical image.

11. The medical image processing system according to claim 1, wherein the recommender recommends the first explanation technique and the second explanation technique according to the type of the medical image and a type of the machine learning model.

12. The medical image processing system according to claim 1, wherein the output controller controls output of a sample image that indicates a display form of the first explanation image and the second explanation image in a simplified manner when the first explanation technique and the second explanation technique are to be recommended.

13. The medical image processing system according to claim 1, wherein the recommender recommends the first explanation technique and the second explanation technique within a range of a condition set by the user.

14. The medical image processing system according to claim 13, wherein the condition includes at least one of a degree of accuracy of the explanation techniques, a period of time required for calculation of ground information, and a usage fee for the explanation techniques.

15. The medical image processing system according to claim 1, wherein the recommender recommends explanation techniques selected by a greater number of other users in regard to the medical image of a type same as that of the medical image as the first explanation technique and the second explanation technique.

16. A medical image processing method executed by a medical image processing system, comprising:

estimating classification of a medical image with use of a machine learning model;

calculating first ground information indicative of estimation ground of the classification by a first explanation technique in which a medical image is divided into predetermined regions and each predetermined region is sequentially replaced into a dummy image as input for the estimation, wherein the first ground information is indicative of the predetermined region including the feature amount that contributes to the estimation result of the classification;

calculating second ground information indicative of estimation ground of the classification by a second explanation technique different from the first explanation technique; and controlling output of a first explanation image based on the first ground information in which explanation information based on the first ground information is superposed on the medical image and a second explanation image based on the second ground information, recommending the first explanation technique and the second explanation technique to a user according to a type of the medical image, wherein the first explanation technique and the second explanation technique are determined by one of a first mode by which two different explanation techniques are recommended and a second mode by which two explanation techniques that have higher ranks in accuracy are recommended, and wherein the first mode and the second mode are switchable by the user.

17. A non-transitory computer readable medium storing instructions that, when executed by a computer, cause the computer to execute the processes of:

estimating classification of a medical image with use of a machine learning model;

calculating first ground information indicative of estimation ground of the classification by a first explanation technique in which a medical image is divided into predetermined regions and each predetermined region is sequentially replaced into a dummy image as input for the estimation, wherein the first ground information is indicative of the predetermined region including the feature amount that contributes to the estimation result of the classification;

calculating second ground information indicative of estimation ground of the classification by a second explanation technique different from the first explanation technique; and controlling output of a first explanation image based on the first ground information in which explanation information based on the first ground information is superposed on the medical image and a second explanation image based on the second ground information, recommending the first explanation technique and the second explanation technique to a user according to a type of the medical image, wherein the first explanation technique and the second explanation technique are determined by one of a first mode by which two different explanation techniques are recommended and a second mode by which two explanation techniques that have higher ranks in accuracy are recommended, and wherein the first mode and the second mode are switchable by the user.

* * * * *